United States Patent
Sakai (10) Patent No.: US 7,445,282 B2
(45) Date of Patent: Nov. 4, 2008

(54) VEHICLE SEAT SLIDE DEVICE

(75) Inventor: Morio Sakai, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/490,145

(22) Filed: Jul. 21, 2006

(65) Prior Publication Data

US 2007/0024096 A1 Feb. 1, 2007

(30) Foreign Application Priority Data

Jul. 27, 2005 (JP) .............................. 2005-218010

(51) Int. Cl.
*B60N 2/42* (2006.01)
(52) U.S. Cl. ............................... 297/216.12
(58) Field of Classification Search ............. 297/216.12
See application file for complete search history.

(56) References Cited

U.S. PATENT DOCUMENTS

| | | | | |
|---|---|---|---|---|
| 6,082,817 | A * | 7/2000 | Muller .................. | 297/216.12 |
| 6,213,548 | B1 * | 4/2001 | Van Wynsberghe et al. ...... | 297/216.12 |
| 6,550,856 | B1 * | 4/2003 | Ganser et al. ........ | 297/216.12 X |
| 6,623,073 | B2 * | 9/2003 | Schafer et al. ......... | 297/216.12 |
| 6,688,697 | B2 * | 2/2004 | Baumann et al. .... | 297/216.12 X |
| 6,715,829 | B2 * | 4/2004 | Svantesson et al. .... | 297/216.12 |
| 6,761,403 | B2 | 7/2004 | Pal et al. | |
| 6,863,343 | B2 * | 3/2005 | Pal et al. ................. | 297/216.12 |
| 6,890,028 | B2 * | 5/2005 | Pal et al. ................. | 297/216.12 |
| 7,048,334 | B2 * | 5/2006 | Pal et al. ................. | 297/216.12 |
| 7,070,205 | B2 * | 7/2006 | Becker et al. ........ | 297/216.12 X |
| 7,070,235 | B2 * | 7/2006 | Schilling et al. ........ | 297/216.12 |
| 7,073,856 | B2 * | 7/2006 | Akaike et al. .......... | 297/216.12 |
| 7,108,320 | B2 * | 9/2006 | Schafer et al. ......... | 297/216.12 |
| 7,111,901 | B2 * | 9/2006 | Schlierf et al. ......... | 297/216.12 |
| 7,195,313 | B2 * | 3/2007 | Hippel et al. .......... | 297/216.12 |
| 2001/0040396 | A1 * | 11/2001 | Kreuels et al. ......... | 297/216.12 |
| 2005/0077762 | A1 * | 4/2005 | Kraemer et al. ........ | 297/216.12 |
| 2007/0257528 | A1 * | 11/2007 | Akaike et al. .......... | 297/216.12 |

FOREIGN PATENT DOCUMENTS

| | | | |
|---|---|---|---|
| EP | 1712406 A1 | * | 10/2006 |
| JP | 2000-211410 A | | 8/2000 |
| JP | 2003-54343 A | | 2/2003 |
| WO | WO 2005073019 A1 | * | 8/2005 |

* cited by examiner

*Primary Examiner*—Rodney B. White
(74) *Attorney, Agent, or Firm*—Buchanan Ingersoll & Rooney PC (57) ABSTRACT

A vehicle seat device includes a headrest rear portion and a headrest front portion provided at a first vehicle, the headrest rear portion supported at a seat back, the headrest front portion moved between a fully closed position and a fully opened position, a driving portion driving the headrest front portion so as to move between the fully closed position and the fully opened position, an impact detecting portion detecting an impact applied to the first vehicle or detecting that an impact will be applied to the first vehicle and outputting a detected signal, a control portion controlling the driving portion to move the headrest front portion, a memory portion memorizing vehicle information including the detected signal the memory portion memorizing information related to an actuating status of the headrest front portion and an occurrence of an actual vehicle collision at a predetermined timing.

10 Claims, 8 Drawing Sheets

FIG.6B
⟨Vehicle ECU⟩

FIG.6A
⟨Headrest ECU⟩

VEHICLE SEAT SLIDE DEVICE

CROSS REFERENCE TO RELATED APPLICATIONS

This application is based on and claims priority under 35 U.S.C. § 119 to Japanese Patent Application 2005-218010, filed on Jul. 27, 2005, the entire content of which is incorporated herein by reference.

FIELD OF THE INVENTION

The present invention relates to a vehicle seat device including a headrest.

BACKGROUND

Each known vehicle seat device, which has been disclosed in JP2000-211410A and JP2003-54343A, has a particular mechanism by which a headrest of a vehicle seat provided at a vehicle (hereinafter referred to as a first vehicle) is moved in the event of a vehicle collision in a front direction of the first vehicle in order to protect a passenger's head from an impact applied to the first vehicle from the rear thereof by such as a following vehicle (hereinafter referred to as a second vehicle).

Generally, when the passenger doesn't sit back on the vehicle seat with leaning his/her upper body backward against the seat back of the vehicle seat, and an impact is applied to the first vehicle from the rear thereof, the upper body of the passenger rapidly moves toward the seat back.

Specifically, the passenger's head rapidly moves backward toward the position of the headrest, and when the passenger's head contacts the headrest, the movement of the passenger's head in a rear direction is regulated. Then, the upper body of the passenger moves forward intensely. At this point, a load is applied to the passenger' neck, as a result, the passenger may suffer from a whiplash injury. According to the known vehicle seat device, the headset of the vehicle seat is moved forward relative to the seat back in order to shorten the distance of the movement of the passenger's head in a rear direction. In this configuration, the level of the load applied to the passenger's neck is reduced, as a result, chances that the passenger suffers from a whiplash injury can be reduced.

In this configuration, when the headrest is moved in a front direction when an impact is applied to the first vehicle from the rear thereof, the headrest needs to be accurately moved in a front direction in order to reduce the load applied to the passenger's neck so as to prevent the passenger from being whiplash injury.

However, it might happen that, for example, the headrest is actuated to move in a front direction even when an impact is not applied to the first vehicle and there is no need to protect the passenger's head from the impact. Specifically, in case that the vehicle seat device has a mechanism moving the headrest on the basis of a level of the load applied to the vehicle seat, the headrest might be moved when the vehicle seat device mistakenly determines the load applied by the passenger who seats on the vehicle seat as an impact applied by the following vehicle.

Further, even when there is no passenger in the vehicle, a headrest may be activated for a variety of reasons. In such case, when the headrest is configured to be retracted automatically by use of a drive generated at a motor or the like after it is moved in a front direction, the user won't even know whether or not the headrest is activated after the headset is restored to its original position. In other words, when the headrest is not appropriately activated, because the headrest becomes in a same state as that of the headrest restored to its original position, it is difficult to figure out whether or not the headrest is actuated correctly.

Further, even when an impact is applied to the first vehicle, the headrest may not be actuated when, for example, the level of the actual impact strength that is applied to the first vehicle is smaller than the level of the impact strength that is set as a required level to actuate the headrest.

The user has not been able to recognize what is a factor of the improper actuation of the headrest. Thus, a need exists to provide a vehicle seat device that can improve the actuating performance of the headrest.

SUMMARY OF THE INVENTION

According to an aspect of the present invention, a vehicle seat device includes a headrest provided at a first vehicle and including a headrest rear portion and a headrest front portion, the headrest rear portion supported at a seat back of the first vehicle, the headrest front portion moved between a fully closed position at which the headrest front portion is located closer to the headrest rear portion and a fully opened position at which the headrest front portion is located distanced from the headrest rear portion, a driving portion driving the headrest front portion so as to move between the fully closed position and the fully opened position, an impact detecting portion detecting an impact applied to the first vehicle or detecting that an impact will be applied to the first vehicle and outputting a detected signal on the basis of the detected result, a control portion controlling the driving portion on the basis of the detected signal outputted by the impact detecting portion so as to move the headrest front portion toward the fully opened position when the impact is applied to the first vehicle from the rear thereof or before the impact is applied to the first vehicle from the rear thereof, a memory portion memorizing vehicle information related to traveling of the first vehicle, the vehicle information including the detected signal outputted by the impact detecting portion, the memory portion memorizing information related to an actuating status of the headrest front portion and an occurrence of an actual vehicle collision in a manner where the control portion controls the memory portion to memorize the vehicle information in the memory portion at a predetermined timing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
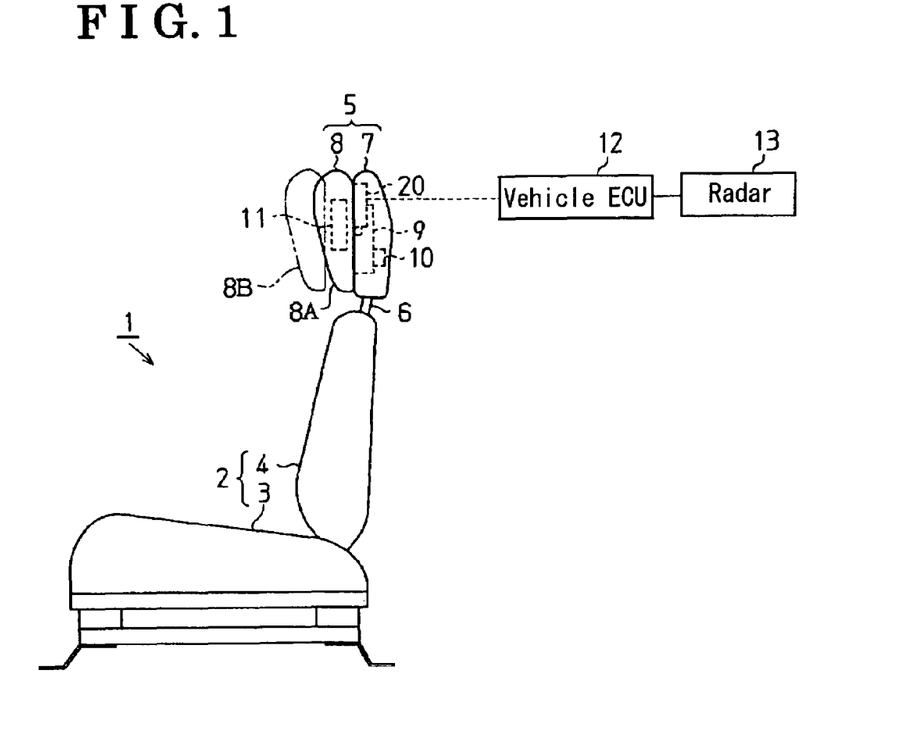
FIG. 1 illustrates a side view of a vehicle seat device.

A first embodiment of the present invention will be explained in accordance with the attached drawings. FIG. 1 illustrates a side view of a vehicle seat device 1 that is provided at a passenger's seat of a first vehicle. As shown in FIG. 1, the vehicle seat device includes a vehicle seat 2, and the vehicle seat 2 includes a seat cushion 3, a seat back 4 and a headrest 5. Specifically, the seat back 4 is supported by the seat cushion 3 so as to be able to incline relative to the seat cushion, and the headrest 5 is supported by the seat back 4.

The headrest 5 includes a headrest rear portion 7 and a headrest front portions. The headrest rear portion 7 is supported by a headrest stay 6 provided at an upper end portion of the seat back 4, and the headrest front portion 8 is provided so as to move in a front-rear direction relative to the headrest rear portion 7. As indicated with a solid line and a chain double-dashed line in FIG. 1, the headrest front portion 8 is reciprocatedly moved in a front-rear direction between a fully closed position 8A, which illustrated by the solid line, and a fully opened position 8B, which is illustrated by the chain double-dashed line. The fully closed position 8A is close to the headrest rear portion 7, and the fully opened position 8B is distanced from the headrest rear portion 7. While the vehicle is in a normal driving status, the headrest front portion 8 is positioned at the fully closed position 3A.

Further, the headrest 5 includes a driving mechanism 9, a motor 10 (e.g., serving as a driving portion), a head detecting sensor 11 and a headrest ECU 20 (electric control unit) (e.g., serving as a control portion). Specifically, the headrest front portion 8 is moved in a front-rear direction of the first vehicle by the driving mechanism 9, the driving mechanism 9 is actuated by a drive generated by the motor 10, and the motor 10 is controlled by the headrest ECU 20. The headrest ECU 20 is connected to a vehicle ECU 12 provided at the side of the vehicle.

The headrest front portion 8 is moved in a front direction of the first vehicle in a manner where the driving mechanism 9 is actuated by the drive generated at the motor 10 so as to be expanded between the headrest rear portion 7 and the headrest front portion 8. On the other hand, the headrest front portion 8 is moved in a rear direction of the first vehicle in a manner where the driving mechanism 9 is actuated by the drive generated at the motor 10 so as to be contracted between the headrest rear portion 7 and the headrest front portion 8.

Figure 3:
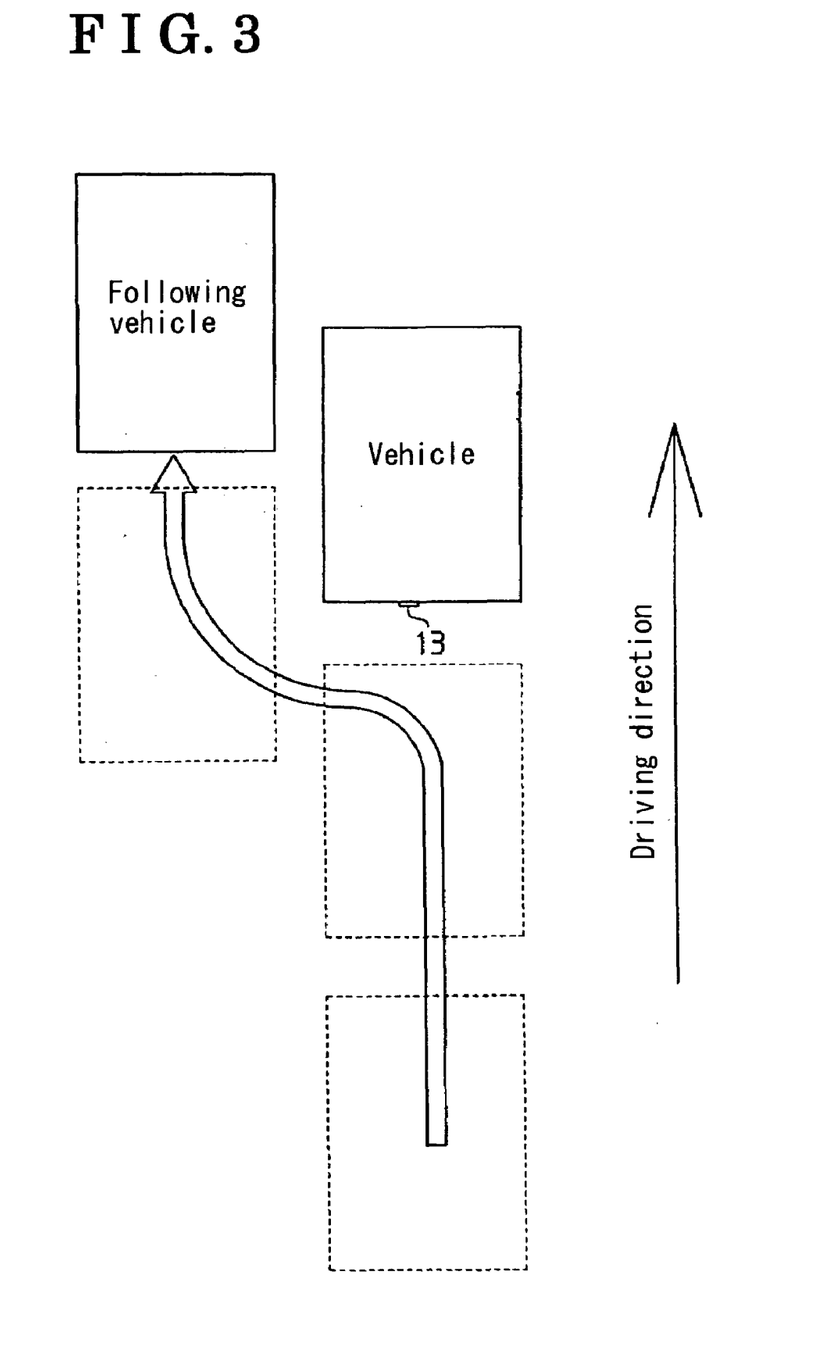
FIG. 3 illustrates an explanation diagram explaining a relationship between a vehicle and a second vehicle.

The vehicle ECU 12 corresponds to an impact detecting portion that detects whether or not an impact is applied to the first vehicle, and whether or not an impact will be applied to the first vehicle. In this embodiment, the vehicle ECU 12 is connected to a radar 13 provided at a rear bumper of the first vehicle as shown in FIG. 3. The radar 13 outputs a detected signal to the vehicle ECU 12 in order to provide information of a relative speed and a relative distance of a second vehicle, which is traveling behind the first vehicle, relative the first vehicle and a vehicle speed of the second vehicle. On the basis of the detected signal outputted by the radar 13, the vehicle ECU 12 determines whether or not the second vehicle collides with the first vehicle, or whether or not there is a possibility that the second vehicle collides with the first vehicle.

A relative speed and a relative distance of the second vehicle relative to the first vehicle when the second vehicle is in a normal driving status are preset at the vehicle ECU 12. In this configuration, if an actual relative speed of the second vehicle relative to the first vehicle becomes larger than the relative speed of the second vehicle in a normal driving status preset at the vehicle ECU 12, and a actual relative distance between the second vehicle and the first vehicle becomes approximate zero; the vehicle ECU 12 detects that the second vehicle collides with the first vehicle.

Further, a relative speed and a relative distance of the second vehicle relative to the first vehicle when the second vehicle has a possibility to collide with the first vehicle are preset at the vehicle ECU 12.

Then, on the basis of the detected signal outputted by the radar 13, if it is determined that a relationship between an actual relative speed of the second vehicle and an actual relative distance between the first vehicle and the second vehicle correspond to the set relative speed and the set relative distance, the vehicle ECU 12 determines that there is a possibility that the second vehicle collides with the first vehicle.

The head detecting sensor 11 detects that the passenger's head who is seating on the vehicle seat 2 contacts the headrest front portion 8. The head detecting sensor 11 is configured of a touch sensor or the like and provided at a front surface of the headrest 5. The motor 10 and the vehicle ECU 12 are connected to the headrest ECU 20. Specifically, the vehicle ECU 12 outputs the detected signal to the headrest ECU 20, and on the basis of the detected signal inputted into the headrest ECU 20, when the second vehicle collides with the first vehicle from the rear thereof, or before the second vehicle collides with the first vehicle from the rear thereof, the headrest ECU 20 controls the motor 10 so as to move the headrest front portion 8 from the fully closed position 8A to the fully opened position 8B.

Further, while the headrest ECU 20 controls the headrest front portion 8 to move from the fully closed position 8A toward the fully opened position 8B, if it is detected that the passenger's head contacts the headrest front portion 8 on the basis of a detected signal outputted from the head detecting sensor 11, the headrest front portion 8 is stopped. Further, if the passenger's head is not detected, the headrest ECU 20 further moves the headrest front portion 8 toward the opened position 8B.

Figure 2:
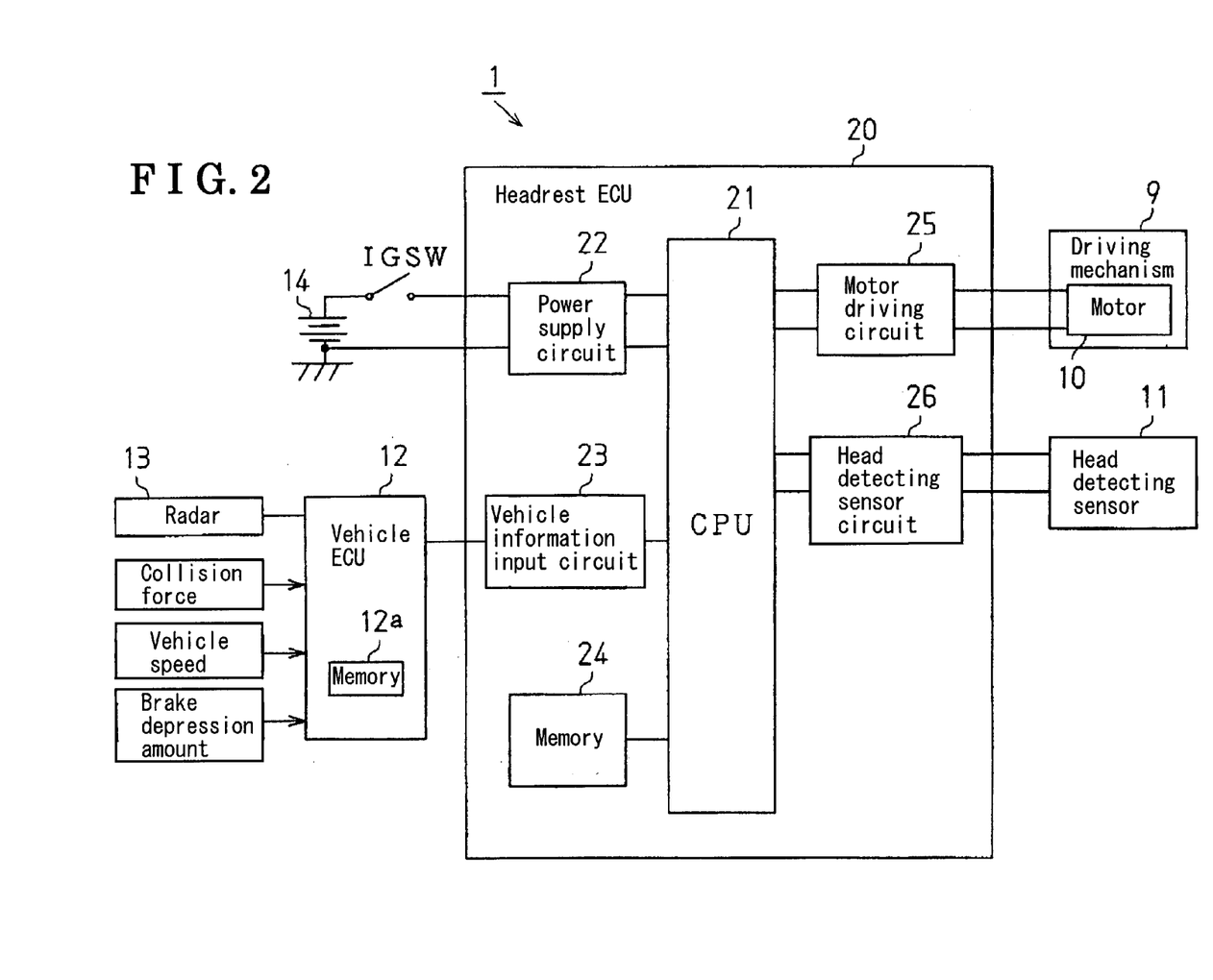
FIG. 2 illustrates a block diagram indicating an electric configuration of the vehicle seat device.

An electrical configuration of the vehicle seat device 1 will be explained below. As shown in FIG. 2, the vehicle seat device 1 includes the headrest ECU 20, the motor 10 connected to the headrest ECU 20, the head detecting sensor 11, the power supply unit 14, the vehicle ECU 12 and the like.

The headrest ECU 20 includes a CPU 21, a power supply circuit 22 connected to the CPU, a vehicle information input circuit 23, a memory 24, a motor driving circuit 25 and a head detecting sensor circuit 26. The CPU 21 is connected to the power supply unit 14 by means of an ignition switch (IGSW). When the ignition switch is turned on, power is supplied from the power supply unit 14 through the power supply circuit 22 to the CPU 21. Further, the vehicle information is inputted from the vehicle ECU 12 into the CPU 21 through the vehicle information input circuit 23.

The vehicle information inputted into the CPU 21 includes information related to a vehicle traveling such as an impact strength detected by an acceleration sensor, a vehicle speed or an amount of a brake depression. The vehicle ECU 12 includes a memory 12a.

The CPU 21 is connected to the motor 10 through the motor driving circuit 25 in order to drive the motor 10 by controlling the motor driving circuit 25. The CPU 21 is also connected to the head detecting sensor 11 through the head detecting sensor circuit 26 in order to input the detected signal outputted from the head detecting sensor 11 and determine whether or not the passenger's head is detected.

The memory 24 serving as a memory portion is connected to the CPU 21 in order to memorizing the vehicle information. The CPU 21 controls the memory 24 to memorize the vehicle information at a predetermined timing. In this manner, information related to an actuating status of the headrest front portion 8 and an occurrence of an actual collision are memorized in the memory 24.

For example, when the CPU 21 outputs a control signal such as a pulse signal in order to drive the motor 10 at a predetermined timing, the CPU 21 also controls the memory 24 to memorize the vehicle information. Further the CPU 21 controls the memory 24 to memorize the vehicle information during a time period A before the predetermined timing and a time period B after the predetermined timing (e.g. plus or minus 10 seconds relative to the predetermined timing).

Further, in this embodiment, the memory 24 includes a nonvolatile memory such as an EEPROM that is detachable to and from the headrest ECU 20. The memory 24 is used for memorizing data such as vehicle information when the ignition switch is turned off and power is not supplied to the headrest ECU 20 due to, for example, a vehicle collision. In this configuration, the user can take out the memory 24 from the headrest ECU 20 and connect it to a personal computer (hereinafter referred to as PC) in order to analyze the information stored in the memory 24.

Further, a memory 12*a* of the vehicle ECU 12 corresponds to the memory portion. For example, when it is detected that an impact will be applied to the first vehicle from the rear by the vehicle ECU 12, in other words, when the vehicle ECU 12 detects information that includes a second vehicle approaches the first vehicle, the vehicle information is memorized in the memory 12*a* of the vehicle ECU 12.

Further, when the vehicle ECU 12 detects that the second vehicle collides with the first vehicle from the rear thereof, the CPU 21 may control the memory 12*a* to memorize the vehicle information. Each timing is considered as a predetermined timing.

An example of a relationship between the vehicle information and whether or not the second vehicle collides with the first vehicle will be explained in detail. FIG. 3 illustrates a pattern diagram indicating a movement of the second vehicle relative to the first vehicle.

As shown in FIG. 3, a radar 13 provided at the rear portion of the first vehicle detects and calculates a relative speed and a relative distance of the second vehicle relative to the first vehicle. In this condition, when the second vehicle passes by the vehicle in a manner where the second vehicle approaches very near to the first vehicle, changes the lane to right or left, and passes by the vehicle; the detected relative speed and the relative distance may be considered that they are similar to the values, which are detected when the second vehicle will collide with the first vehicle.

In this case, there is a possibility that the vehicle ECU 12 outputs a detected signal indicating that the second vehicle will collide with the first vehicle, in other words, the vehicle ECU 12 outputs information indicating that the second vehicle approaches the first vehicle; as a result, the headrest ECU 20 moves the headrest front portion 8 in a front direction.

In this embodiment, the headrest ECU 20 controls the memory 24 to memorize the vehicle information at a predetermined timing (as shown in FIG. 2) in order to provide an evident used for examining the actuation of the headrest front portion 8.

Figure 4A:
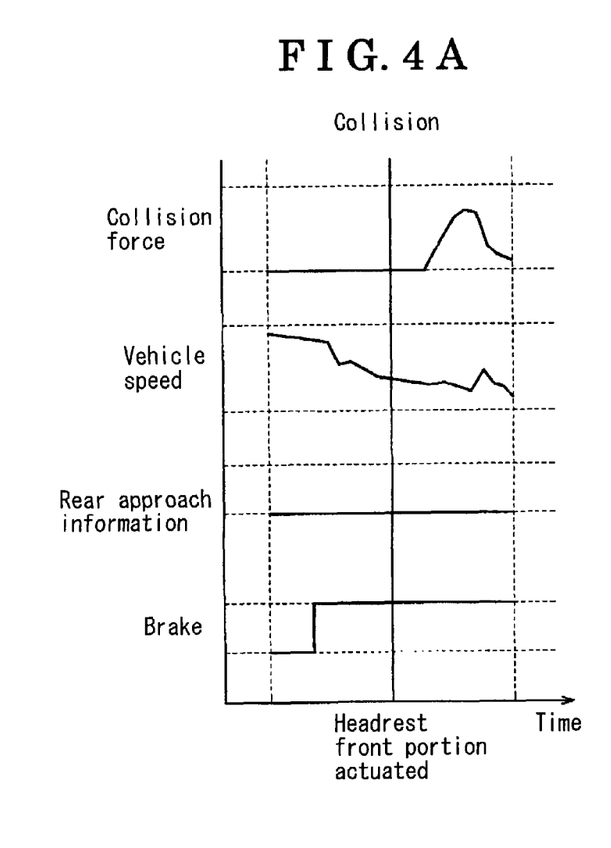
FIG. 4A illustrates a graph indicating an example of vehicle information.
Figure 4B:
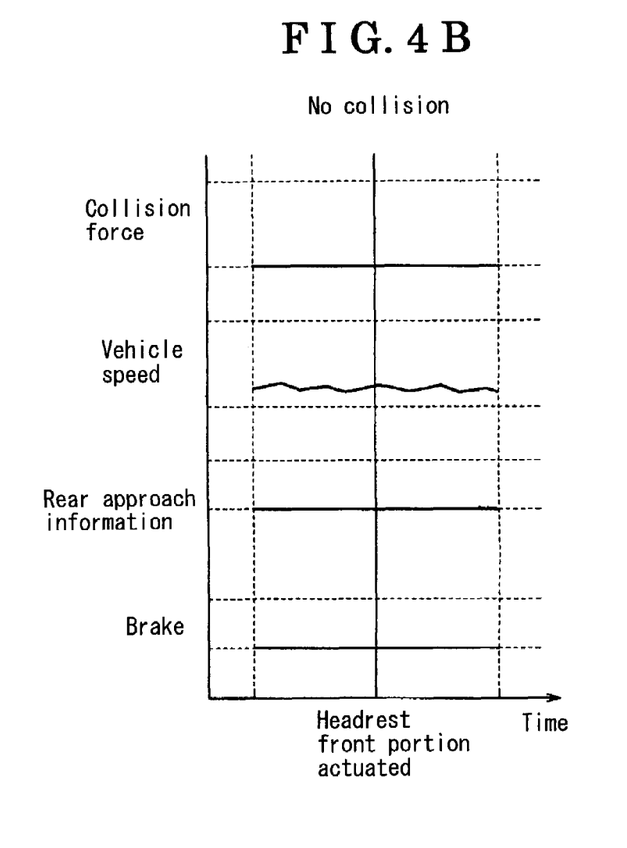
FIG. 4B illustrates a graph indicating another example of vehicle information.

FIG. 4A and FIG. 4B illustrate graphs indicating vehicle information in each ten second before and after the actuation of the headrest front portion 8. Specifically, FIG. 4A indicates the vehicle information when the second vehicle collides with the first vehicle, and FIG. 4B indicates the vehicle information when the second vehicle does not collide with the first vehicle.

As shown in FIG. 4A and FIG. 4B, either when the second vehicle collides with the first vehicle or not, it is detected that the second vehicle approaches the rear portion of the first vehicle.

However, when the second vehicle actually collides with the first vehicle, it is detected that a collision force is generated, the vehicle speed varies and the brake is depressed before the headrest front portion 8 is actuated. On the other hand, when the second vehicle does not collide with the first vehicle, the collision force, the vehicle speed and the amount of the brake depression is an approximately constant in the same manner as that is in a normal driving status.

Thus, because the vehicle information is memorized when the headrest front portion 8 is actuated, the relationship between the actuation of the headrest front portion 8 and the occurrence of the actual collision can be analyzed. Then, processes executed by the headrest ECU 20 of the vehicle seat device 1 will be explained. The headrest ECU 20 executes the process illustrated in a flow chart in FIG. 5 when the headrest ECU 20 controls the memory 24 to memorize the vehicle information. In the process illustrated in FIG. 5, the headrest ECU 20 controls the memory 24 thereof to memorize the vehicle information at a time when the headrest front portion 8 is actuated.

Figure 5:
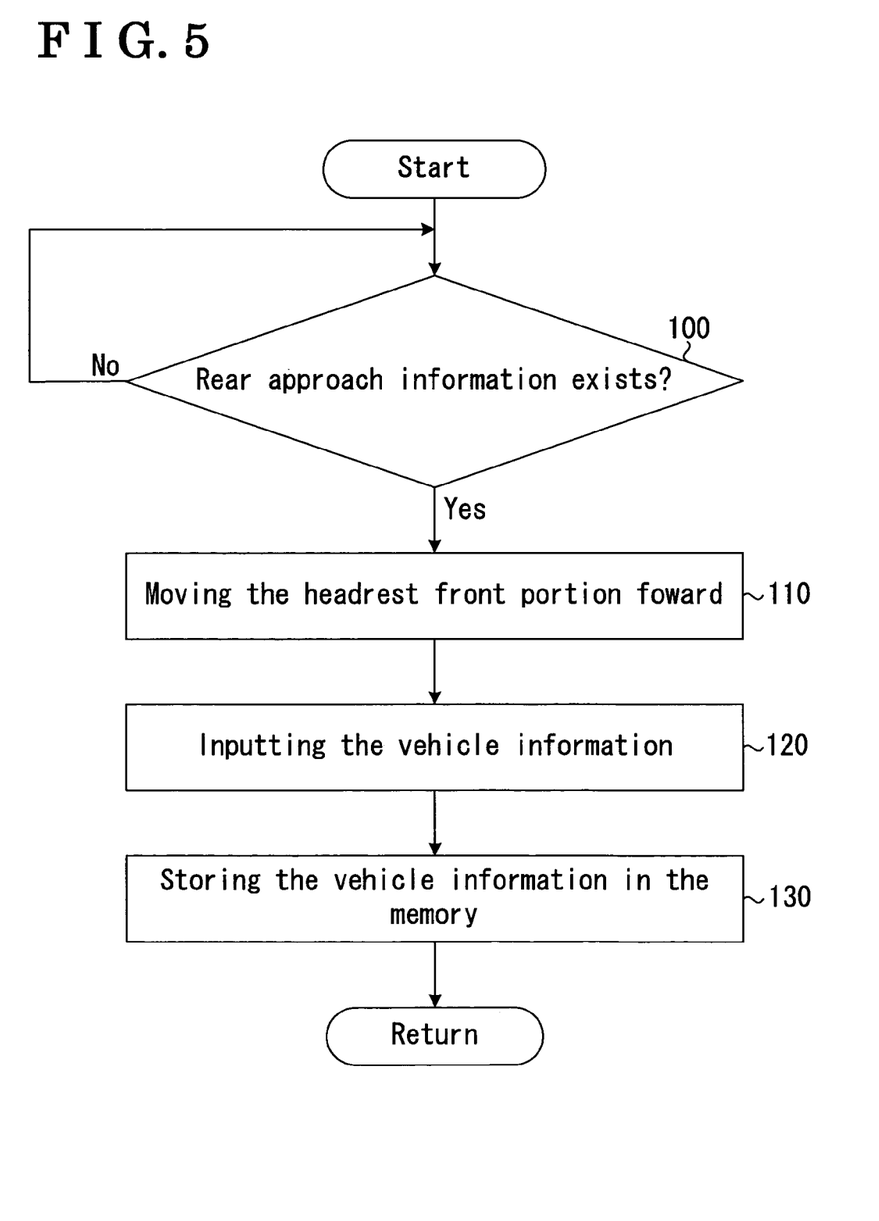
FIG. 5 illustrates a flow chart explaining a process executed by ECU.

As shown in FIG. 5, in Step 100, the CPU 21 of the headrest ECU 20 determines whether or not the information indicating that the second vehicle approaches the first vehicle exists. When the CPU 21 determines that the information indicating that the second vehicle approaches the first vehicle does not exist (Step 100 NO), then the process goes back to the start and repeats Step 100 again. When the CPU 21 determines that the information indicating that the second vehicle approaches the first vehicle exists (Step 100 YES), the CPU 21 process to Step 110, and then the headrest front portion 8 is moved in a front direction of the first vehicle.

Then, the process proceeds to Step 120. In Step 120, the CPU 21 inputs the vehicle information from the vehicle ECU 12.

The process goes to Step 130. In Step 130, the CPU 21 controls the memory 24 to memorize the vehicle information outputted by the vehicle ECU 12. While the ignition switch of the first vehicle has been turned on, the above processes are repeated.

Figure 6A:
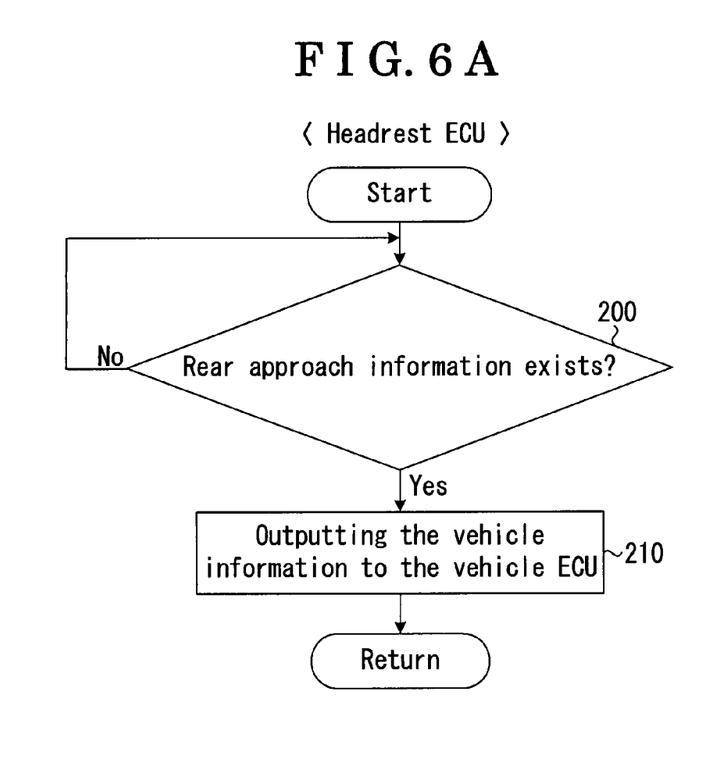
FIG. 6A illustrates a flow chart explaining a process executed by a headrest ECU.
Figure 6B:
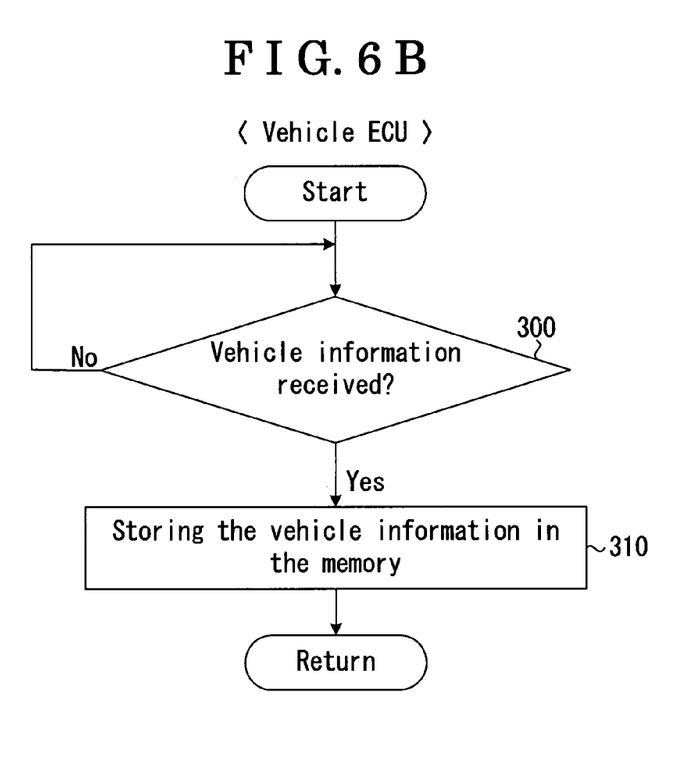
FIG. 6B illustrates a flow chart explaining a process executed by a vehicle ECU.

When the headrest ECU 20 controls the memory 12*a* thereof to memorize the vehicle information, the headrest ECU 20 executes the processes indicated in flow charts illustrated in FIGS. 6A and 6B. In these processes, the headrest ECU 20 sends the vehicle information when the information indicating that the second vehicle approaches the first vehicle from the rear thereof is detected, and at this point, the vehicle information is memorized in then memory 12*a* of the vehicle ECU 12. The headrest ECU 20 executes the processes illustrated in FIG. 6A, and the vehicle ECU 12 executes processes illustrated in FIG. 6B.

As shown in FIG. 6A, in Step 200, the headrest ECU 20 determines whether or not the information indicating that the second vehicle approaches the first vehicle exists. When the headrest ECU 20 determines that the information indicating the second vehicle approaches the first vehicle does not exist (Step 200 NO), the headrest ECU 20 repeats the process in Step 200.

When the headrest ECU 20 determines that the information indicating that second vehicle approaches the first vehicle exists (Step 200 YES), the headrest ECU 20 proceeds to Step 210 and outputs the vehicle information at that time to the vehicle ECU 12. Then, the headrest ECU 20 finishes the process. The vehicle information at this point includes information indicating whether or not the headrest front portion 8 is actuated.

On the other hand, as shown in FIG. 6B, the vehicle ECU 12 determines in Step 300 whether or not the vehicle information from the headrest ECU 20 has been received. When the vehicle ECU 12 determines that the vehicle information has not been received (Step 300 NO), the vehicle ECU 12 repeats the process in Step 300.

When the vehicle ECU 12 determines that the vehicle information has been received (Step 300 YES), the vehicle ECU 12 proceeds to Step 310, controls the memory 12a to memorize the vehicle information and finish the process. Each headrest ECU 20 and the vehicle ECU 12 repeats the above processes while the ignition switch of the first vehicle has been turned on. The vehicle information memorized in the memory 12a of the vehicle ECU 12 may be displayed at, for example a displaying portion mounted to the first vehicle.

According to the embodiment, because the headrest ECU 20 controls the memory 24 and the memory 12a to memorize the vehicle information related to the vehicle traveling including the fact that an impact is applied to the first vehicle at a predetermined timing, the relationship between the actuation of the headrest front portion 8 and the vehicle information can be analyzed.

Thus, it can be confirmed later whether or not the headrest front portion 8 is actuated under an appropriate condition, as a result, the performance of the actuation of the headrest front portion 8 can be improved.

According to the embodiment, the headrest ECU 20 controls the memory 24 and the memory 12a to memorize the vehicle information when the headrest front portion 8 is moved, it can be easy to confirm after the headrest front portion 8 is actuated the condition of the first vehicle at the time when the headrest front portion 8 is actuated. Thus, it can be analyzed whether or not the headrest front portion 8 is actuated under an appropriate condition.

According to the embodiment, because the headrest ECU 20 controls the memory 12a to memorize the vehicle information when the vehicle ECU 12 detects that an impact will be applied to the first vehicle, in other words the vehicle ECU 12 detects information that the second vehicle approaches the first vehicle, it can be analyzed whether or not the headrest front portion 8 is actuated under an appropriate condition when the impact is applied to the first vehicle in the event of the vehicle collision.

According to the embodiment, because the headrest ECU 20 controls the memory 24 to memorize the vehicle information while each time period before and after the predetermined timing at which the vehicle information is memorized in the memory 24, the user can analyze the actuation of the headrest front portion 8.

According to the embodiment, because the vehicle information includes a vehicle speed, a braking status and information related to the second vehicle that approaches the first vehicle, the user could analyze the actuation of the headrest front portion in association with the fact whether or not an impact occurred by the vehicle collision is applied to the first vehicle.

Second Embodiment

A second embodiment according to the present invention will be explained in accordance with the attached drawings.

Figure 7:
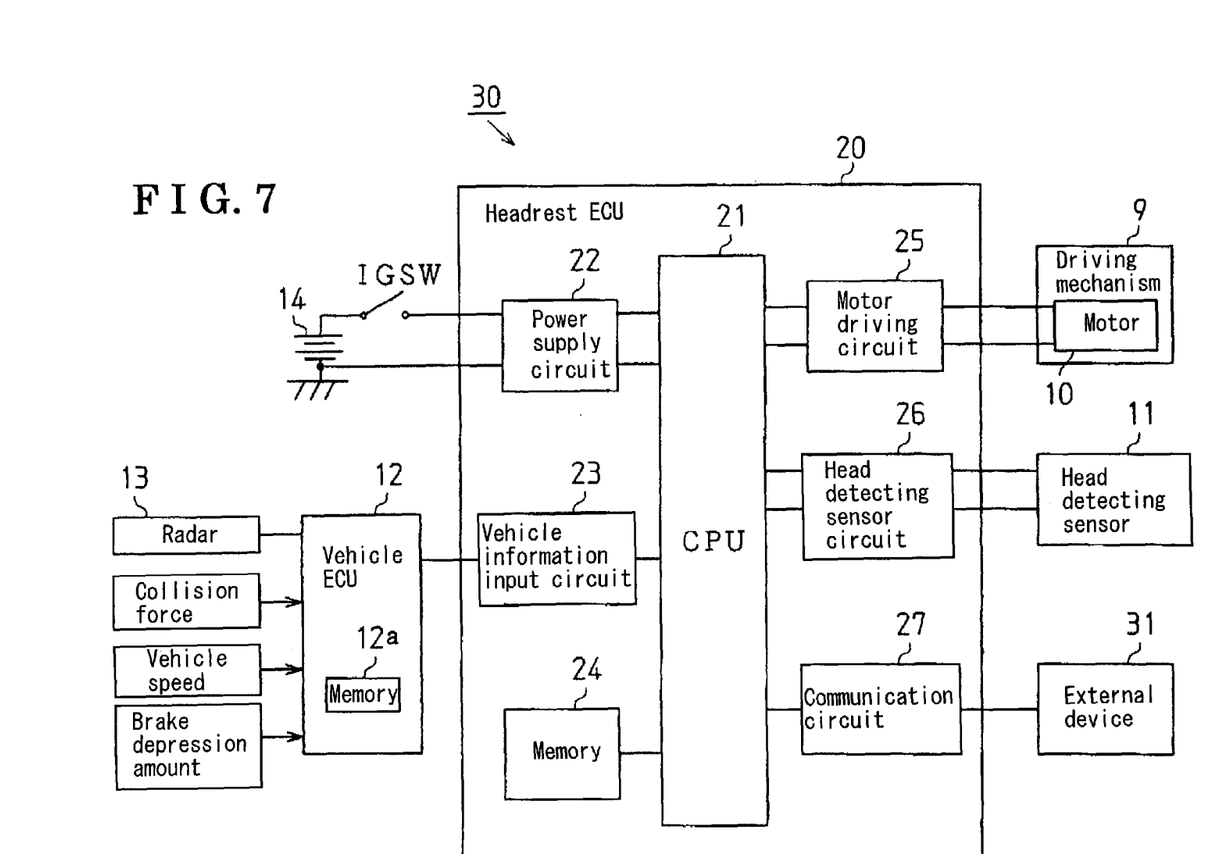
FIG. 7 illustrates a block diagram indicating a electric configuration of another vehicle seat device.

FIG. 7 illustrates a block diagram indicating an electrical configuration of a vehicle seat device 30 of the second embodiment.

The vehicle seat device 30 of the second embodiment has a similar configuration to the vehicle seat device 1 of the first embodiment. In addition to the configuration of the vehicle seat device 1, an external device 31 and a communication circuit 27 are provided to the vehicle seat device 30 if necessary. Specifically, the external device 31 is connected to the CPU 21 of the headrest ECU 20 by means of the communication circuit 27. The external device 31 is used for examining whether or not the headrest ECU 20 actuates properly. In this configuration, the CPU 21 of the headrest ECU 20 and the external device 31 can intercommunicate each other by means of the communication circuit 27.

More specifically, the external device 31 outputs data of a relationship between the actuating status of the headrest front portion 8 and the occurrence of the actual collision.

The external device 31 is used at a car dealer or a repair shop. Specifically, they use the data later in order to examine the actuation of the headrest ECU 20 and to analyze in what situation the headrest front portion 8 is actuated if the headrest front portion 8 is actuated.

The external device 31 is a personal computer or the like. The external device 31 intercommunicates with the headrest ECU 20 in order to receive information of the actuating status of the headrest front portion 8 and the vehicle information related to the actuating status of the headrest front portion 8. Thus, the user can analyze the actuating status of the headrest front portion 8 at the external device 31 on the basis of the received vehicle information outputted by the headrest ECU 20 by operating the external device 31.

Figure 8:
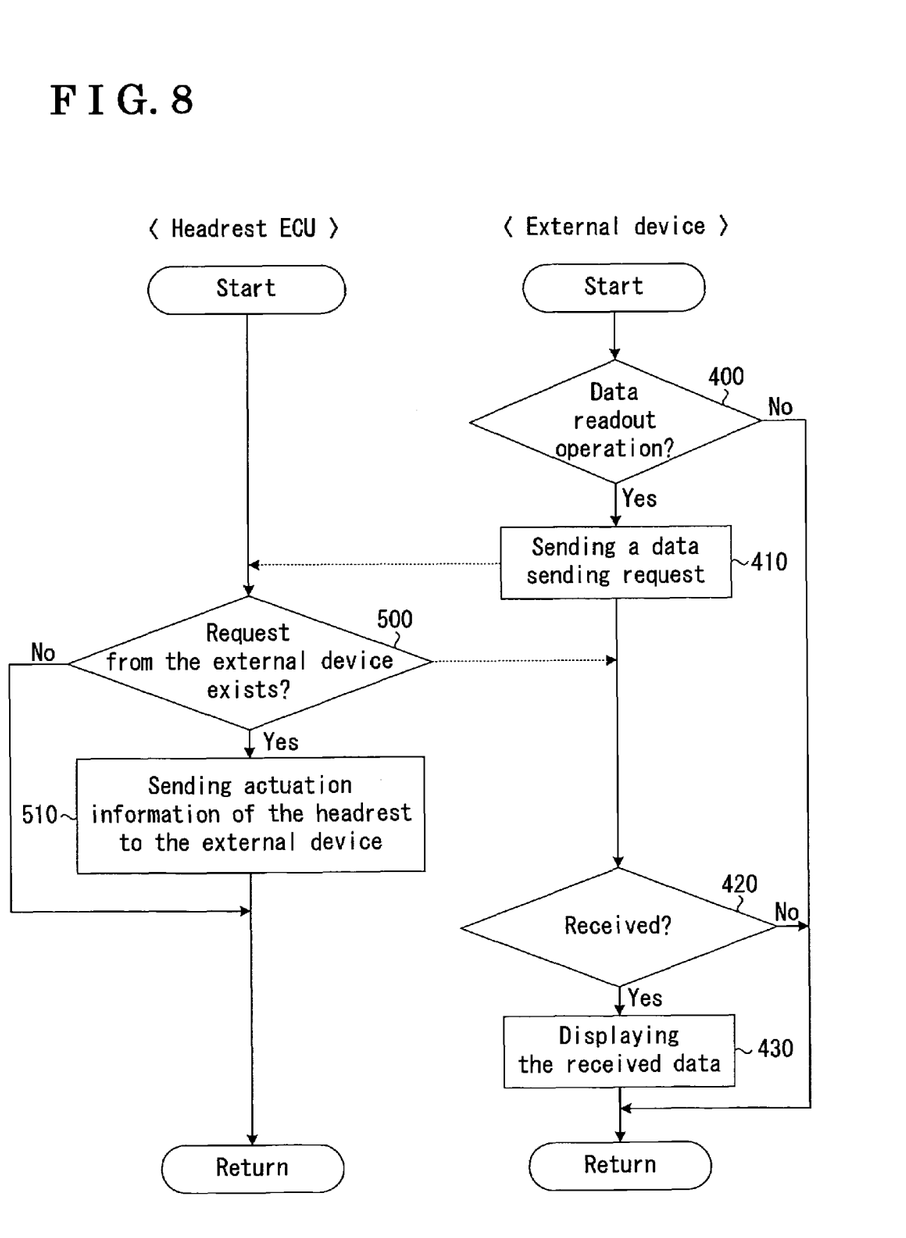
FIG. 8 illustrates a flow chart explaining processes executed by ECU and an external device.

Processes executed by the headrest ECU 20 of the vehicle seat device 30 and the external device 31 of the vehicle seat device 30 will be explained. As shown in FIG. 8, the external device 31 determines whether or not the user operates to read data in Step 400. If it is determined that the user does not operate the external device 31 in order to read the data (Step 400 NO), the external device 31 finishes the process. If it is determined that the user operate the external device 31 in order to read the data (Step 400 YES), the process goes to Step 410, and a data sending request is sent to the headrest ECU 20.

On the other hand, the headrest ECU 20 determines in Step 500 whether or not the data sending request outputted from the external device 31 is received. If the data sending request is not received (Step 500 NO), the headrest ECU 20 finishes the process.

If the data sending request is received (Step 500 YES), the process of the headrest ECU 20 goes to Step 510. In Step 510, the headrest ECU 20 sends the vehicle information and the like to the external device 31. Then, the process of the external device 31 goes to Step 420. In Step 420, the headrest ECU 20 determines whether or not the vehicle information is received by the external device 31. If it is determined that the vehicle information has not been received (Step 420 YES), the process of the external device 31 goes to Step 430. In Step 430, the received vehicle information and the like are displayed as an image such as the drawing illustrated in FIG. 3 on the displaying device or the like, and then the process is finished.

The headrest ECU 20 and the external device 31 repeat the above processes while the ignition switch of the first vehicle has been turned on.

According to the embodiment, because the information of the relationship between the actuating status of the headrest front portion 8 and an occurrence of an actual collision is outputted, a causal relationship between the actuating status of the headrest front portion 8 and the vehicle information can be analyzed. Thus, it can be confirmed later whether or not the headrest front portion is actuated under an appropriate condition, as a result, the performance of the actuation of the headrest can be improved.

According to the embodiment, because the headrest ECU 20 includes the communication circuit 27 by which the headrest ECU 20 and the external device 31 could intercommunicate each other, the user can easily read the vehicle information at the external device 31.

According to the embodiment, because the vehicle information is sent to the external device 31, a volatile memory of large volume or the like can be used as the memory 24 and the memory 12a in order to memorize a large amount of data in there, in other words, data measured during a long time period can be memorized.

According to the above embodiments, the headrest ECU 20 controls the memory 24 and the memory 12a to memorize the vehicle information when a pulse signal used for moving the headrest front portion 8 is outputted, and when the information that the second vehicle that approaches the first vehicle is detected. However, the headrest ECU may controls the memory 24 and the memory 12a to memorize the vehicle information at another timing.

For example, the headrest ECU 20 may control the memory 24 and the memory 12a to memorize the vehicle information at predetermined time intervals. In this configuration, a traveling state of the first vehicle can be confirmed, for example, it can be confirmed whether or not the headrest front portion 8 is somehow accidentally actuated while the vehicle is in a normal driving status.

In the above embodiments, the vehicle ECU 12 is used as a impact detecting portion, however, another device may be applied as the impact detecting portion as long as it can detect an impact is applied to the first vehicle or an impact will be applied to the first vehicle.

For example, the impact applied to the first vehicle may be detected by a load sensor or the like mounted at the vehicle seat. In this configuration, a predetermined threshold is set in advance at the load sensor, and the load sensor determines that an impact is applied to the first vehicle when the level of the impact that is applied to the load sensor exceeds the predetermined threshold.

Further, in the above embodiments, the headrest ECU 20 inputs the vehicle information outputted from the vehicle ECU 12, however, the headrest ECU 20 may input the vehicle information from another device. For example, the vehicle information related to a collision force may be directly inputted into the headrest ECU 20.

In the above embodiments, the vehicle information includes a detected signal outputted by the radar 13, an impact strength detected by the acceleration sensor mounted to the first vehicle, a vehicle speed, the amount of the brake depression and the like, however, the vehicle information may not include all of these information and may include another information as long as they can be used to confirm the traveling state of the first vehicle. For example, the vehicle information may include such as a stealing angle in addition to the above information.

In the above embodiments, the headrest front portion 8 is moved by means of a drive generated at the motor 10; however, the headrest front portion 8 may be actuated by means of a spring, a solenoid or the like as long as the headrest front portion 8 can be moved between its fully closed position 8A and the fully opened position 8B.

In the above embodiments, the headrest 5 includes the head detecting sensor 11, however, the head detecting sensor 11 may not be provided at the headrest 5. In this case, a distance between the fully closed position 8A and the fully opened position 8B is set in advance, and a speed of the movement of the headrest front portion 8 from the fully closed position 8A to the fully closed position 8B can be set in advance in order to control the movement of the headrest front portion 8.

In the above embodiments, each vehicle seat devices 1 and 30 is applied to the passenger seat; however, it may be applied to a driver's seat, a rear seat or the like.

The control portion controls the memory portion at a predetermined timing to memorize the vehicle information related to traveling of the vehicle, and the vehicle information includes information related to the fact that an impact is applied to the first vehicle. Further, on the basis of the memorized vehicle information, the actuating status of the headrest front portion and information of whether or not the vehicle collision occurs are also memorized in the memory portion.

Thus, the relationship between the actuating status of the headrest front portion and the vehicle information can be examined, and then it can be confirmed later whether or not the headrest front portion is actuated under an appropriate condition, as a result, the actuating performance of the headrest can be improved.

Further, because the external device outputs the information of the relationship between the actuating status of the headrest front portion and the occurrence of an actual collision, a causal relationship between the actuating status of the headrest front portion and the vehicle in formation can be examined. Thus, it can be confirmed later whether or not the headrest front portion is actuated under an appropriate condition, as a result, the actuating performance of the headrest can be improved.

Furthermore, the control portion controls the memory portion to memorize the vehicle information when the headrest front portion is moved, it can be easy to confirm after the headrest front portion has actuated the condition of the first vehicle at the time when the headrest front portion is actuated. Thus, it can be analyzed whether or not the headrest front portion is actuated under an appropriate condition.

The control portion controls the memory portion to memorize the vehicle information when the impact detecting portion detects that an impact will be applied to the first vehicle or an impact is applied to the first vehicle. Thus, it can be analyzed whether or not the headrest front portion is actuated under an appropriate condition at the time when the impact is applied to the first vehicle in the event of the vehicle collision after the vehicle collision has occurred.

Further, because the control portion controls the memory portion to memorize the vehicle information at the predetermined timing, the traveling status of the vehicle can be confirmed, and it also can be confirmed whether or not the headrest front portion is actuated due to an impact that is not caused by a vehicle collision. Thus, a causal relationship between the vehicle information and the actuating status of the headrest front portion can be analyzed.

The control portion controls the memory portion to memorize the vehicle information during a predetermined time period so that the user can analyzed the actuation of the headrest front portion.

The vehicle information includes the vehicle speed, the braking status and the information related to an existence of a second vehicle that travels so as to follow the first vehicle and approaches the first vehicle. Thus, the user can analyze the actuation of the headrest front portion in association with the vehicle status of, for example, whether or not an impact is applied to the vehicle.

The memory portion includes a nonvolatile memory that is detachable to and from the control portion. Thus, the user can take out the memory portion from the control portion and connect it to a personal computer or the like in order to analyze the information stored in the memory portion.

The external device is used at one of the car dealer or the repair shop. Thus, the actuation status of the control portion can be examined, and the actuating status of the headrest front portion can be analyzed after the headrest front portion has been actuated.

The vehicle information includes one of the vehicle speed, the braking status or the information related to an existence of a second vehicle that travels so as to follow the first vehicle and approaches the first vehicle, and the control portion controls the memory portion to memorize the vehicle information on the basis of the detected signal outputted by the impact detecting portion. Thus, in what state the headrest front portion is actuated can be analyzed in association with the detected signal detected by the impact detecting portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which full within the spirit and scope of the present invention as defined in the claims, be embraced thereby.

The invention claimed is:

1. A vehicle seat device comprising:
   a headrest provided at a vehicle and including a headrest rear portion and a headrest front portion;
   the headrest rear portion supported at a seat back of the vehicle;
   the headrest front portion moved between a fully closed position at which the headrest front portion is located closer to the headrest rear portion and a fully opened position at which the headrest front portion is located distanced from the headrest rear portion;
   a driving portion driving the headrest front portion so as to move between the fully closed position and the fully opened position;
   an impact detecting portion detecting an impact applied to the vehicle or detecting that an impact will be applied to the vehicle and outputting a detected signal on the basis of the detected result;
   a control portion controlling the driving portion on the basis of the detected signal outputted by the impact detecting portion so as to move the headrest front portion toward the fully opened position when the impact is applied to the vehicle from the rear thereof or before the impact is applied to the vehicle from the rear thereof, and so as to move the headrest front portion toward the fully closed position after having moved the headrest front portion toward the fully opened position;
   a memory portion memorizing vehicle information related to traveling of the vehicle;
   the vehicle information including the detected signal outputted by the impact detecting portion;
   the memory portion memorizing historical information related to an actuating status of the headrest front portion and an occurrence of an actual vehicle collision in a manner where the control portion controls the memory portion to cumulatively memorize the vehicle information in the memory portion at a predetermined timing.

2. The vehicle seat device according to claim 1, wherein the control portion is connected to an external device in order to output information related to a relationship between the actuating status of the headrest front portion and the occurrence of the actual vehicle collision on the basis of the vehicle information memorized in the memory portion.

3. The vehicle seat device according to claim 2, wherein the external device is used at one of a car dealer or a repair shop.

4. The vehicle seat device according to claim 1, wherein the control portion controls the memory portion to memorize the vehicle information when a control signal is outputted in order to drive the driving portion.

5. The vehicle seat device according to claim 1, wherein the control portion controls the memory portion to memorize the vehicle information on the basis of the detected signal outputted by the impact detecting portion.

6. The vehicle seat device according to claim 1, wherein the control portion controls the memory portion to memorize the vehicle information at predetermined time intervals.

7. The vehicle seat device according to claim 1, wherein the control portion controls the memory portion to memorize the vehicle information during a time period before and after the predetermined timing at which the vehicle information is memorized in the memory portion.

8. The vehicle seat device according to claim 1, wherein the vehicle is one vehicle and wherein the vehicle information includes a vehicle speed, a braking status and information related to an existence of another vehicle that travels so as to follow the one vehicle and approaches the one vehicle.

9. The vehicle seat device according to claim 1, wherein the memory portion includes a nonvolatile memory that is detachable to and from the control portion.

10. The vehicle seat device according to claim 1, wherein the vehicle is one vehicle and wherein the vehicle information includes one of a vehicle speed, a braking status or information related to an existence of another vehicle that travels so as to follow the one vehicle and approaches the one vehicle, and the control portion controls the memory portion to memorize the vehicle information on the basis of the detected signal outputted by the impact detecting portion.

* * * * *